(12) United States Patent
Mamchuk et al.

(10) Patent No.: US 11,292,470 B2
(45) Date of Patent: Apr. 5, 2022

(54) SYSTEM METHOD TO ESTABLISH A LANE-CHANGE MANEUVER

(71) Applicant: GM GLOBAL TECHNOLOGY OPERATIONS LLC, Detroit, MI (US)

(72) Inventors: Tetyana V. Mamchuk, Walled Lake, MI (US); Paul A. Adam, Milford, MI (US); Gabriel T. Choi, Novi, MI (US); Joseph M. Burdge, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 166 days.

(21) Appl. No.: 16/734,597

(22) Filed: Jan. 6, 2020

(65) Prior Publication Data

US 2021/0206377 A1    Jul. 8, 2021

(51) Int. Cl.
| | | |
|---|---|---|
| *G01C 21/32* | (2006.01) | |
| *B60W 30/10* | (2006.01) | |
| *B60W 30/18* | (2012.01) | |
| *B60W 60/00* | (2020.01) | |
| *G05D 1/02* | (2020.01) | |

(52) U.S. Cl.
CPC .... *B60W 30/18163* (2013.01); *B60W 60/001* (2020.02); *G05D 1/0212* (2013.01); *B60W 2710/202* (2013.01); *G05D 2201/0213* (2013.01)

(58) Field of Classification Search
CPC .... B60W 60/001; B60W 30/00; B60W 10/18; B60W 30/18163; B60W 30/10; B60W 40/04; B60W 60/01; B60W 40/06; B60W 30/181; B60W 30/12; B60W 10/184; B60W 50/082; G05D 1/0221; G05D 1/0077; G05D 1/0289; G06K 9/00791; G06K 9/00; G08G 1/167; B60R 21/01538; G01C 21/3461;
(Continued)

(56) References Cited

U.S. PATENT DOCUMENTS

| | | | |
|---|---|---|---|
| 2014/0129073 A1* | 5/2014 | Ferguson | G05D 1/00 701/23 |
| 2017/0197634 A1* | 7/2017 | Sato | B60W 50/082 |

(Continued)

FOREIGN PATENT DOCUMENTS

| | | | | |
|---|---|---|---|---|
| CN | 103395391 A | * | 11/2013 | B60Q 1/50 |
| CN | 109737976 A | * | 5/2019 | G01C 21/32 |

OTHER PUBLICATIONS

Xing, Shiyu and Jakiela, Mark "Lane Change Strategy for Autonomous Vehicle" (2018). Mechanical Engineering and Materials Science Independent Study, 43 pages.
(Continued)

*Primary Examiner* — Yuri Kan
(74) *Attorney, Agent, or Firm* — Lorenz & Kopf LLP

(57) ABSTRACT

A method to establish a lane-change maneuver, the method includes the steps of calculating a plurality of anchor points along a projected vehicle route and, based on the plurality of anchor points, generating a lane-change maneuver trajectory. The plurality of anchor points can include: a first anchor point based on time, a second anchor point where the vehicle would cross a lane boundary from a host lane to a target lane, and a third anchor point where counter steering torque would be applied to center the vehicle in the target lane.

17 Claims, 6 Drawing Sheets

(58) Field of Classification Search
CPC .... G01C 21/3658; G01C 21/26; G01C 21/32; B62D 15/025; B62D 15/0255; B60Q 1/50
See application file for complete search history.

(56) References Cited

U.S. PATENT DOCUMENTS

| | | | |
|---|---|---|---|
| 2017/0197635 A1* | 7/2017 | Sato | B60W 30/10 |
| 2017/0240176 A1* | 8/2017 | Aoki | G08G 1/167 |
| 2018/0201272 A1* | 7/2018 | Takeda | B60W 10/184 |
| 2019/0071079 A1* | 3/2019 | Nishiguchi | B60W 30/12 |
| 2019/0071099 A1* | 3/2019 | Nishiguchi | B62D 15/0255 |
| 2020/0207354 A1* | 7/2020 | Ishioka | B60W 30/18163 |
| 2020/0207355 A1* | 7/2020 | Ishioka | B60W 30/181 |
| 2020/0210718 A1* | 7/2020 | Soni | G06K 9/00791 |
| 2020/0211394 A1* | 7/2020 | King | G05D 1/0289 |
| 2020/0353951 A1* | 11/2020 | Spehr | B60W 40/06 |
| 2021/0108936 A1* | 4/2021 | Seegmiller | G01C 21/3461 |
| 2021/0173402 A1* | 6/2021 | Chang | G06K 9/00 |

OTHER PUBLICATIONS

Mehmood, Adeel et al. "Trajectory Planning and Control for Lane-Change of Autonomous Vehicle" (2019). 5th International Conference on Control, Automation and Robotics, 5 pages.

* cited by examiner

SYSTEM METHOD TO ESTABLISH A LANE-CHANGE MANEUVER

Blind tests have shown drivers prefer automated lane-change maneuvers that minimize lateral velocity, acceleration, and jerk. However, drivers have also reported these kinds of maneuvers as "not feeling right", for example, when the drivers have observed vehicle motion while looking at the vehicle's surrounding environment. It is therefore desirable to provide a system and method that satisfies unconscious human expectations for what constitutes an optimal maneuver during automated lane changes. It is also desirable for this system and method observes rule of thirds calculations to envision an optimal trajectory prior to deploying the maneuver. Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to establish a lane-change maneuver, the method includes: calculating a plurality of anchor points along a projected vehicle route; and based on the plurality of anchor points, generating a lane-change maneuver trajectory. Other embodiments of this aspect include corresponding computer systems, apparatus, and computer programs recorded on one or more computer storage devices, each configured to perform the actions of the methods.

Implementations may include one or more of the following features. The method further including the step of, based on the lane-change maneuver trajectory, performing the lane-change maneuver through an autonomous vehicle. The method further including the step of verifying the lane-change maneuver trajectory is in compliance with one or more vehicle dynamics thresholds. The method where the lane-change maneuver trajectory overlaps each anchor point of the plurality of anchor points. The method where each anchor point of the plurality of anchor points is located in a longitudinal direction of the projected vehicle route based on the following equation: $p_{long}=\frac{1}{3}t_{LCoD}$. The method where the plurality of anchor points includes: a first anchor point based on time; relative to the first anchor point, a second anchor point where the vehicle would cross a lane boundary from a host lane to a target lane; and relative to the second anchor point, a third anchor point where counter steering torque would be applied to center the vehicle in the target lane. The method where the second anchor point and third anchor point of the plurality of anchor points is located in the lateral direction of the projected vehicle route based on the following equation: $p_{lat}=(W_t+W_h)/3$. Implementations of the described techniques may include hardware, a method or process, or computer software on a computer-accessible medium.

One general aspect includes a system to establish a lane-change maneuver, the system includes: a memory configured to include one or more executable instructions and a processor configured to execute the executable instructions, where the executable instructions enable the processor to carry out the following steps: calculating a plurality of anchor points along a projected vehicle route; and based on the plurality of anchor points, generating a lane-change maneuver trajectory. Other embodiments of this aspect include corresponding computer systems, apparatus, and computer programs recorded on one or more computer storage devices, each configured to perform the actions of the methods.

Implementations may include one or more of the following features. The system where the executable instructions enable the processor to carry out an additional step of, based on the lane-change maneuver trajectory, performing the lane-change maneuver through an autonomous vehicle. The system where the executable instructions enable the processor to carry out an additional step of verifying the lane-change maneuver trajectory is in compliance with one or more vehicle dynamics thresholds. The system where the lane-change maneuver trajectory overlaps each anchor point of the plurality of anchor points. The system where each anchor point of the plurality of anchor points is located in a longitudinal direction of the projected vehicle route based on the following equation: $p_{long}=\frac{1}{3}t_{LCoD}$. The system where the plurality of anchor points includes: a first anchor point based on time; relative to the first anchor point, a second anchor point where the vehicle would cross a lane boundary from a host lane to a target lane; and relative to the second anchor point, a third anchor point where counter steering torque would be applied to center the vehicle in the target lane. The system where the second anchor point and third anchor point of the plurality of anchor points is located in the lateral direction of the projected vehicle route based on the following equation: $p_{lat}=(W_t+W_h)/3$. Implementations of the described techniques may include hardware, a method or process, or computer software on a computer-accessible medium.

One general aspect includes a non-transitory and machine-readable medium having stored thereon executable instructions adapted to establish a lane-change maneuver, which when provided to a processor and executed thereby, causes the processor to carry out the following steps: calculating a plurality of anchor points along a projected vehicle route; and based on the plurality of anchor points, generating a lane-change maneuver trajectory. Other embodiments of this aspect include corresponding computer systems, apparatus, and computer programs recorded on one or more computer storage devices, each configured to perform the actions of the methods.

Implementations may include one or more of the following features. The non-transitory and machine-readable memory further includes an additional step of, based on the lane-change maneuver trajectory, performing the lane-change maneuver through an autonomous vehicle. The non-transitory and machine-readable memory further includes an additional step of verifying the lane-change maneuver trajectory is in compliance with one or more vehicle dynamics thresholds. The non-transitory and machine-readable memory where the lane-change maneuver trajectory overlaps each anchor point of the plurality of anchor points. The non-transitory and machine-readable memory where the plurality of anchor points includes: a first anchor point based on time; relative to the first anchor point, a second anchor point where the vehicle would cross a lane boundary from a host lane to a target lane; and relative to the second anchor point, a third anchor point where counter steering torque would be applied to center the vehicle in the target lane. The non-transitory and machine-readable memory where each anchor point of the plurality of anchor points is located in a longitudinal direction of the projected vehicle route based on the following: $p_{long}=\frac{1}{3}t_{LCoD}$. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
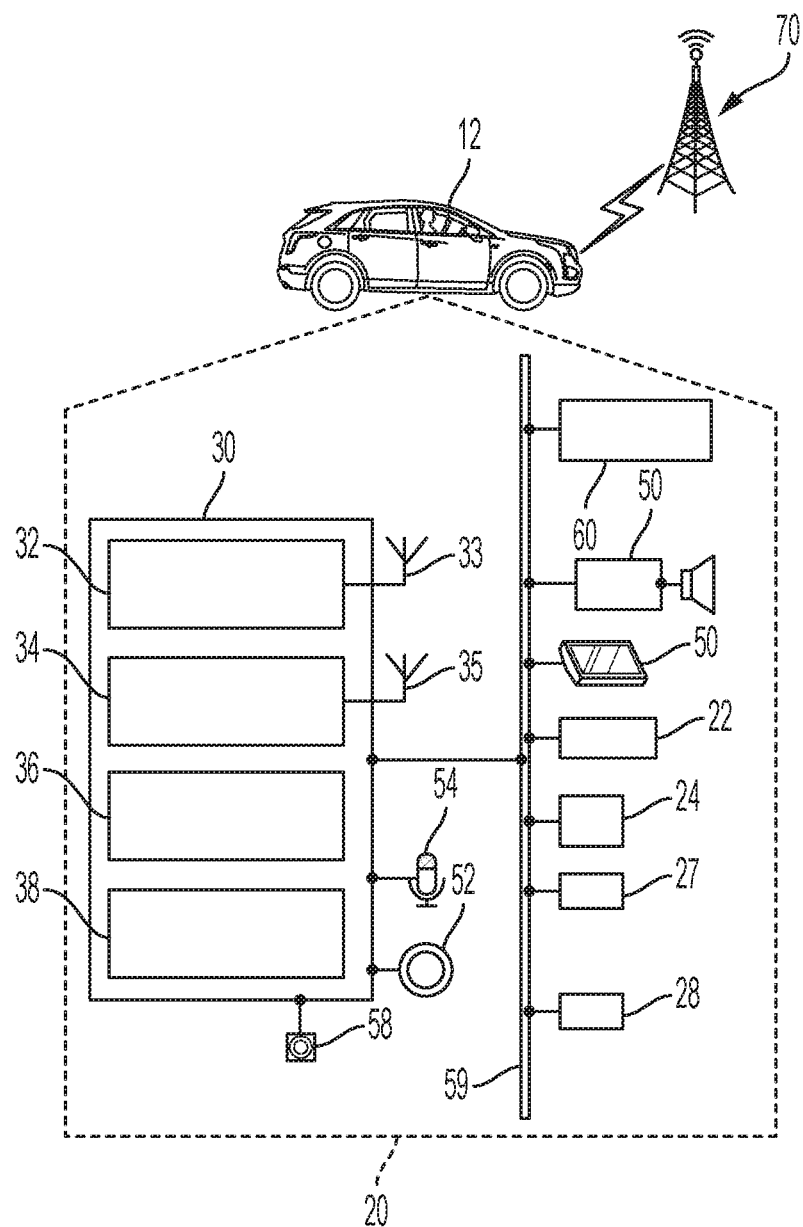
FIG. 1 is a block diagram depicting an exemplary embodiment of an electronics system capable of utilizing the system and method disclosed herein.

With reference to FIG. 1, vehicle 12 is depicted in the illustrated embodiment as a sports utility vehicle (SUV), but it should be appreciated that any other vehicle including motorcycles, trucks, passenger sedan, recreational vehicles (RVs), marine vessels, aircraft including unmanned aerial vehicles (UAVs), etc., can also be used. In certain embodiments, vehicle 12 may include a power train system with multiple generally known torque-generating devices including, for example, an engine. The engine may be an internal combustion engine that uses one or more cylinders to combust fuel, such as gasoline, in order to propel vehicle 12. The power train system may alternatively include numerous electric motors or traction motors that convert electrical energy into mechanical energy for propulsion of vehicle 12.

Some of the vehicle electronics 20 are shown generally, in FIG. 1 and includes a global navigation satellite system (GNSS) receiver 22, a body control module or unit (BCM) 24, and other vehicle system modules (VSMs) 28, a telematics unit 30, vehicle-user interfaces 50-58, and onboard computer 60. Some or all of the different vehicle electronics may be connected for communication with each other via one or more communication busses, such as communication bus 59. The communication bus 59 provides the vehicle electronics with network connections using one or more network protocols and can use a serial data communication architecture. Examples of suitable network connections include a controller area network (CAN), a media-oriented system transfer (MOST), a local interconnection network (LIN), a local area network (LAN), and other appropriate connections such as Ethernet or others that conform with known ISO, SAE, and IEEE standards and specifications, to name but a few. In other embodiments, a wireless communications network that uses short-range wireless communications (SRWC) to communicate with one or more VSMs of the vehicle can be used. In one embodiment, the vehicle 12 can use a combination of a hardwired communication bus 59 and SRWCs. The SRWCs can be carried out using the telematics unit 30, for example.

The vehicle 12 can include numerous vehicle system modules (VSMs) as part of vehicle electronics 20, such as the GNSS receiver 22, BCM 24, telematics unit 30 (vehicle communications system), vehicle-user interfaces 50-56, and onboard computer 60, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is hardwire connected by communication bus 59 to the other VSMs including the telematics unit 30. Moreover, each of the VSMs can include and/or be communicatively coupled to suitable hardware that enables intra-vehicle communications to be carried out over the communication bus 59; such hardware can include, for example, bus interface connectors and/or modems. One or more VSMs 28 may periodically or occasionally have their software or firmware updated and, in some embodiments, such vehicle updates may be over the air (OTA) updates that are received from a remote computer or facility via a land network (not shown) and telematics unit 30. As is appreciated by those skilled in the art, the above-mentioned VSMs are only examples of some of the modules that may be used in vehicle 12, as numerous others are also possible. It should also be appreciated that these VSMs can otherwise be known as electronic control units, or ECUs.

Global navigation satellite system (GNSS) receiver 22 receives radio signals from a constellation of GNSS satellites (not shown). The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites (not shown). And, in another example, GNSS receiver 22 can be a BDS receiver that receives a plurality of GNSS (or BDS) signals from a constellation of GNSS (or BDS) satellites. The GNSS received can determine a current vehicle location based on reception of a plurality of GNSS signals from the constellation of GNSS satellites. The vehicle location information can then be communicated to the telematics unit 30, or other VSMs, such as the onboard computer 60. In one embodiment (as shown in FIG. 1), the wireless communications module 30 and/or a telematics unit can be integrated with the GNSS receiver 22 so that, for example, the GNSS receiver 22 and the telematics unit 30 (or the wireless communications device) are directly connected to one another as opposed to being connected via communication bus 59. In other embodiments, the GNSS receiver 22 is a separate, standalone module or there may be a GNSS receiver 22 integrated into the telematics unit 30 in addition to a separate, standalone GNSS receiver connected to telematics unit 30 via communication bus 59.

Body control module (BCM) 24 can be used to control various VSMs 28 of the vehicle, as well as obtain information concerning the VSMs, including their present state or status, as well as sensor information. The BCM 24 is shown in the exemplary embodiment of FIG. 1 as being electrically coupled to the communication bus 59. In some embodiments, the BCM 24 may be integrated with or part of a center stack module (CSM) and/or integrated with telematics unit 30 or the onboard computer 60. Or, the BCM may be a separate device that is connected to other VSMs via bus 59. The BCM 24 can include a processor and/or memory, which can be similar to processor 36 and memory 38 of telematics unit 30, as discussed below. The BCM 24 may communicate with wireless device 30 and/or one or more vehicle system modules, such as an engine control module (ECM), driver monitoring system 71, audio system 56, or other VSMs 28; in some embodiments, the BCM 24 can communicate with these modules via the communication bus 59. Software stored in the memory and executable by the processor enables the BCM to direct one or more vehicle functions or operations including, for example, controlling central locking, controlling an electronic parking brake, power sun/moon roof, the vehicle's head lamps, air conditioning operations, power mirrors, controlling the vehicle primary mover (e.g., engine, primary propulsion system), and/or controlling various other vehicle system modules (VSMs).

Onboard computer 60 can otherwise be known as an electronic control unit (ECU) and controls one or more of the electrical systems or subsystems of vehicle 12. As follows, onboard computer 60 functions as a central vehicle computer that can be used to carry out various vehicle tasks. Also, one or more other VSMs can be incorporated with or controlled by onboard computer 60. These VSMs can include, but are not limited to, the engine control module (ECM), powertrain control module (PCM), transmission control module (TCM), body control module (BCM), brake control module (EBCM), center stack module (CSM), central timing module (CTM), general electronic module (GEM), body control module (BCM), and suspension control module (SCM).

Telematics unit 30 is capable of communicating data via SRWC through use of SRWC circuit 32 and/or via cellular network communications through use of a cellular chipset 34, as depicted in the illustrated embodiment. The telematics unit 30 can provide an interface between various VSMs of the vehicle 12 and one or more devices external to the vehicle 12, such as one or more networks or systems at a remote call center (e.g., ON-STAR by GM). This enables the vehicle to communicate data or information with remote systems at a remote call center.

In at least one embodiment, the telematics unit 30 can also function as a central vehicle computer that can be used to carry out various vehicle tasks. In such embodiments, the telematics unit 30 can be integrated with the onboard computer 60 such that the onboard computer 60 and the telematics unit 30 are a single module. Or, the telematics unit 30 can be a separate central computer for the vehicle 12 in addition to the onboard computer 60. Also, the wireless communications device can be incorporated with or a part of other VSMs, such as a center stack module (CSM), body control module (BCM) 24, an infotainment module, a head unit, a telematics unit, and/or a gateway module. In some embodiments, the telematics unit 30 is a standalone module, and can be implemented as an OEM-installed (embedded) or aftermarket device that is installed in the vehicle.

In the illustrated embodiment, telematics unit 30 includes, the SRWC circuit 32, the cellular chipset 34, a processor 36, memory 38, SRWC antenna 33, and antenna 35. The telematics unit 30 can be configured to communicate wirelessly according to one or more SRWC protocols such as any of the Wi-Fi™, WiMAX™, Wi-Fi™ Direct, other IEEE 802.11 protocols, ZigBee™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. And, in some embodiments, the telematics unit 30 can be configured to communicate using IEEE 802.11p such that the vehicle can carry out vehicle-to-vehicle (V2V) communications, or vehicle-to-infrastructure (V2I) communications with infrastructure systems or devices, such as at a remote call center. And, in other embodiments, other protocols can be used for V2V or V2I communications.

The SRWC circuitry 32 enables the telematics unit 30 to transmit and receive SRWC signals, such as BLE signals. The SRWC circuit can allow the telematics unit 30 to connect to another SRWC device (e.g., a smart phone). Additionally, in some embodiments, the telematics unit 30 contains a cellular chipset 34 thereby allowing the device to communicate via one or more cellular protocols, such as those used by cellular carrier system 70, through antenna 35. In such a case, the telematics unit 30 is user equipment (UE) that can be used to in carry out cellular communications via cellular carrier system 70.

Antenna 35 is used for communications and is generally known to be located throughout vehicle 12 at one or more locations external to the telematics unit 30. Using antenna 35, telematics unit 30 may enable the vehicle 12 to be in communication with one or more local or remote networks (e.g., one or more networks at a remote call center or server) via packet-switched data communication. This packet switched data communication may be carried out through use of a non-vehicle wireless access point or cellular system that is connected to a land network via a router or modem. When used for packet-switched data communication such as TCP/IP, the communications device 30 can be configured with a static Internet Protocol (IP) address or can be set up to automatically receive an assigned IP address from another device on the network such as a router or from a network address server.

Packet-switched data communications may also be carried out via use of a cellular network that may be accessible by the telematics unit 30. Communications device 30 may, via cellular chipset 34, communicate data over wireless carrier system 70. In such a scenario, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the telematics unit 30 to provide a wide variety of services. For instance, in one embodiment, the processor 36 can execute programs or process data to carry out at least a part of the method discussed herein. Memory 38 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. In one embodiment, the telematics unit 30 also includes a modem for communicating information over the communication bus 59.

Vehicle electronics 20 also includes a number of vehicle-user interfaces that provide vehicle occupants with a means of providing and/or receiving information, including visual display 50, pushbutton(s) 52, microphone 54, audio system 56, and camera 58. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, and/or control input. Audio system 56 provides audio output to a vehicle occupant and can be a dedicated, stand-alone system or part of the primary vehicle audio system. According to one embodiment, audio system 56 is operatively coupled to both vehicle bus 59 and an entertainment bus (not shown) and can provide AM, FM and satellite radio, CD, DVD, and other multimedia functionality. This functionality can be provided in conjunction with or independent of an infotainment module. Microphone 54 provides audio input to the telematics unit 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, a video projector that projects images onto the windshield from the vehicle cabin ceiling, or some other display. For example, display 50 can be the touch screen of the vehicle's infotainment module at the center console of the vehicle's interior. Various other vehicle-user interfaces can also be utilized, as the interfaces of FIG. 1 are only an example of one particular implementation.

Camera 58 can be of the digital variety and can capture one or more images that can then be transmitted to telematics unit 30 and processor 36. Camera 58 can be installed at any acceptable location to view the head position of the vehicle operator 68. For example, in one or more embodiments, the camera 58 can be installed on the dashboard, steering wheel (or steering column), or rear-view mirror and be part of a driver monitoring system (DMS). The DMS (also known as a Driver Attention Monitor or DAM), is a vehicle safety system that implements camera 58 as well as other infrared sensors to monitor the attentiveness of the vehicle operator. The DMS can also deploy facial recognition software to monitor the eyelid positions of the vehicle operator to detect if they are becoming drowsy. If the vehicle operator does not seem to be paying attention to the road or seems to be getting drowsy, the DMS can alert the driver by providing one or more notifications in the vehicle interior (e.g., visual notifications via display 50, audible notifications via audio system 56, or tactile notifications via piezo-electric devices installed in the driver seat).

Figure 2:
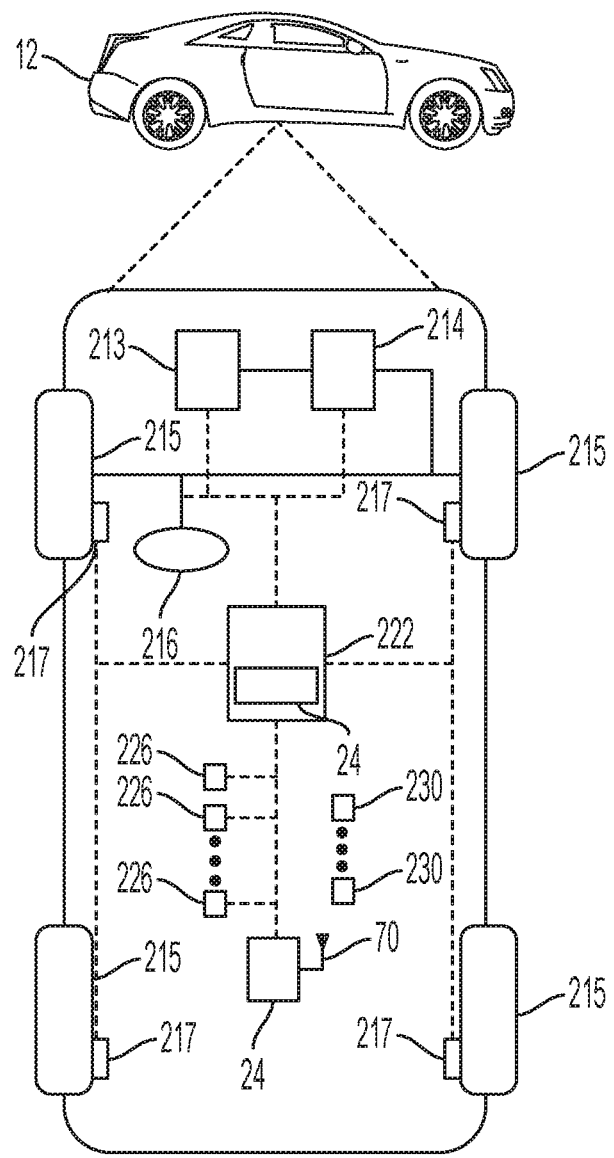
FIG. 2 is a schematic diagram of a vehicle having autonomous capabilities, according to an embodiment of the communications system of FIG. 1.

As shown in FIG. 2, one or more embodiments of vehicle 12 may include features to implement an autonomous driving mode. With such embodiments, in addition to the systems discussed above, vehicle 12 further includes a transmission 214 configured to transmit power from the propulsion system 213 to a plurality of vehicle wheels 215 according to selectable speed ratios. According to various embodiments, the transmission 214 may include a step-ratio automatic transmission, a continuously-variable transmission, or other appropriate transmission. The vehicle 12 additionally includes wheel brakes 217 configured to provide braking torque to the vehicle wheels 215. The wheel brakes 217 may, in various embodiments, include friction brakes, a regenerative braking system such as an electric machine, and/or other appropriate braking systems. The vehicle 12 additionally includes a steering system 216. It should be understood that each of these systems may also be operated manually, for example, when vehicle 12 is in a manual operation mode or when the autonomous driving mode is being override for emergency purposes.

Telematics unit 30 is moreover configured to wirelessly communicate with other vehicles ("V2V") and/or infrastructure ("V2I") and/or pedestrians ("V2P"). These communications may collectively be referred to as a vehicle-to-entity communication ("V2X"). In an exemplary embodiment, in addition to the communication channels listed above, this communication system is further configured to communicate via at least one dedicated short-range communications (DSRC) channel. DSRC channels refer to one-way or two-way short-range to medium-range wireless communication channels specifically designed for automotive use and a corresponding set of protocols and standards.

When vehicle 12 is in this autonomous driving mode, the propulsion system 213, transmission 214, steering system 216, and wheel brakes 217 will be in communication with or under the control of at least one controller 222. While depicted as a single unit for illustrative purposes, the controller 222 may additionally include one or more other controllers, collectively referred to as a "controller." The controller 222 may also be embedded in telematics unit 30, BCM 24, and/or onboard computer 60.

The controller 222 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 222 in controlling the vehicle.

Controller 222 includes an automated driving system (ADS) 224 for automatically controlling various actuators in the vehicle while in an autonomous mode. Autonomous modes have been categorized into numerical levels ranging from zero (0), corresponding to no automation (i.e., full human control), to five (5), corresponding to full automation with no human control. Autonomous modes, such as cruise control, adaptive cruise control, and lane and parking assistance systems correspond to lower automation levels, while true "driverless" vehicles correspond to higher automation levels (implementing the systems discussed below).

Autonomous mode equipped vehicles having a Level Two and Level Three system can handle minor dynamic driving tasks but still require intervention from a human and may, in certain situations, require assistance from a human. As mentioned above, examples of known Level Two and Level Three systems include adaptive cruise control and lane assist systems which control certain aspects of the driving experience despite a human having their hands physically on the steering wheel. Other examples include intelligent parking assist systems (IPAS) which enable the vehicle to steer itself into a parking space with little or no input from a human. On the other hand, a Level Four system indicates "high automation", referring to the driving mode-specific performance by an automated driving system of all aspects of the dynamic driving task, even if a human driver does not respond appropriately to a request to intervene. Moreover, a Level Five system indicates "full automation", referring to the full-time performance by an automated driving system of all aspects of the dynamic driving task under all roadway and environmental conditions that can be managed by a human driver.

Figure 3:
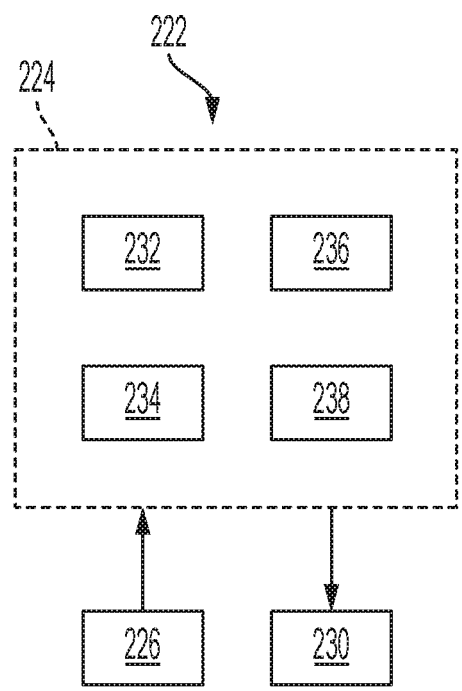
FIG. 3 is a schematic block diagram of an exemplary automated driving system (ADS) for the vehicle of FIG. 2

In an exemplary embodiment, the ADS 224 is configured to communicate automated driving information with and control propulsion system 213, transmission 214, steering system 216, and wheel brakes 217 to control vehicle acceleration, steering, and braking, respectively, without human intervention via a plurality of actuators 230 in response to inputs from a plurality of driving sensors 226, which may include GPS, RADAR, LIDAR, optical cameras, thermal cameras, ultrasonic sensors, and/or additional sensors as appropriate. In various embodiments, the instructions of the ADS 224 may be organized by function or system. For example, as shown in FIG. 3, (especially when Vehicle 12 is equipped to provide Level Four or Level Five automation) ADS 224 can include a sensor fusion system 232 (computer vision system), a positioning system 234, a guidance system 236, and a vehicle control system 238. As can be appreciated, in various embodiments, the instructions may be organized into any number of systems (e.g., combined, further partitioned, etc.) as the disclosure is not limited to the present examples.

In various embodiments, the sensor fusion system 232 synthesizes and processes sensor data and predicts the presence, location, classification, and/or path of objects and features of the environment of the vehicle 12. In various embodiments, the sensor fusion system 232 can incorporate information from multiple sensors, including but not limited to cameras, LIDARS, radars, and/or any number of other types of sensors. In one or more exemplary embodiments described herein, the sensor fusion system 232 supports or otherwise performs the ground reference determination processes and correlates image data to LIDAR point cloud data, the vehicle reference frame, or some other reference coordinate frame using calibrated conversion parameter values associated with the pairing of the respective camera and reference frame to relate LIDAR points to pixel locations, assign depths to the image data, identify objects in one or more of the image data and the LIDAR data, or otherwise synthesize associated image data and LIDAR data. In other words, the sensor output from the sensor fusion system 232 provided to the vehicle control system 238 (e.g., indicia of detected objects and/or their locations relative to the vehicle 12) reflects or is otherwise influenced by the calibrations and associations between camera images, LIDAR point cloud data, and the like.

The positioning system 234 processes sensor data along with other data to determine a position (e.g., a local position relative to a map, an exact position relative to lane of a road, vehicle heading, velocity, etc.) of the vehicle 12 relative to the environment. The guidance system 236 processes sensor data along with other data to determine a path for the vehicle 12 to follow (i.e., path planning data). The vehicle control system 238 generates control signals for controlling the vehicle 12 according to the determined path.

In various embodiments, the controller 222 implements machine learning techniques to assist the functionality of the controller 222, such as feature detection/classification, obstruction mitigation, route traversal, mapping, sensor integration, ground-truth determination, and the like.

The output of controller 222 is communicated to actuators 230 when the autonomous driving mode is activated. In an exemplary embodiment, the actuators 230 include a steering control, a shifter control, a throttle control, and a brake control. The steering control may, for example, while in the autonomous driving mode, control a steering system 216 as illustrated in FIG. 2. The shifter control may, for example, while in the autonomous driving mode, control a transmission 214 as illustrated in FIG. 2. The throttle control may, for example, while in the autonomous driving mode, control a propulsion system 213 as illustrated in FIG. 2. The brake control may, for example, while in the autonomous driving mode, control wheel brakes 217 as illustrated in FIG. 2.

Method

Figure 4:
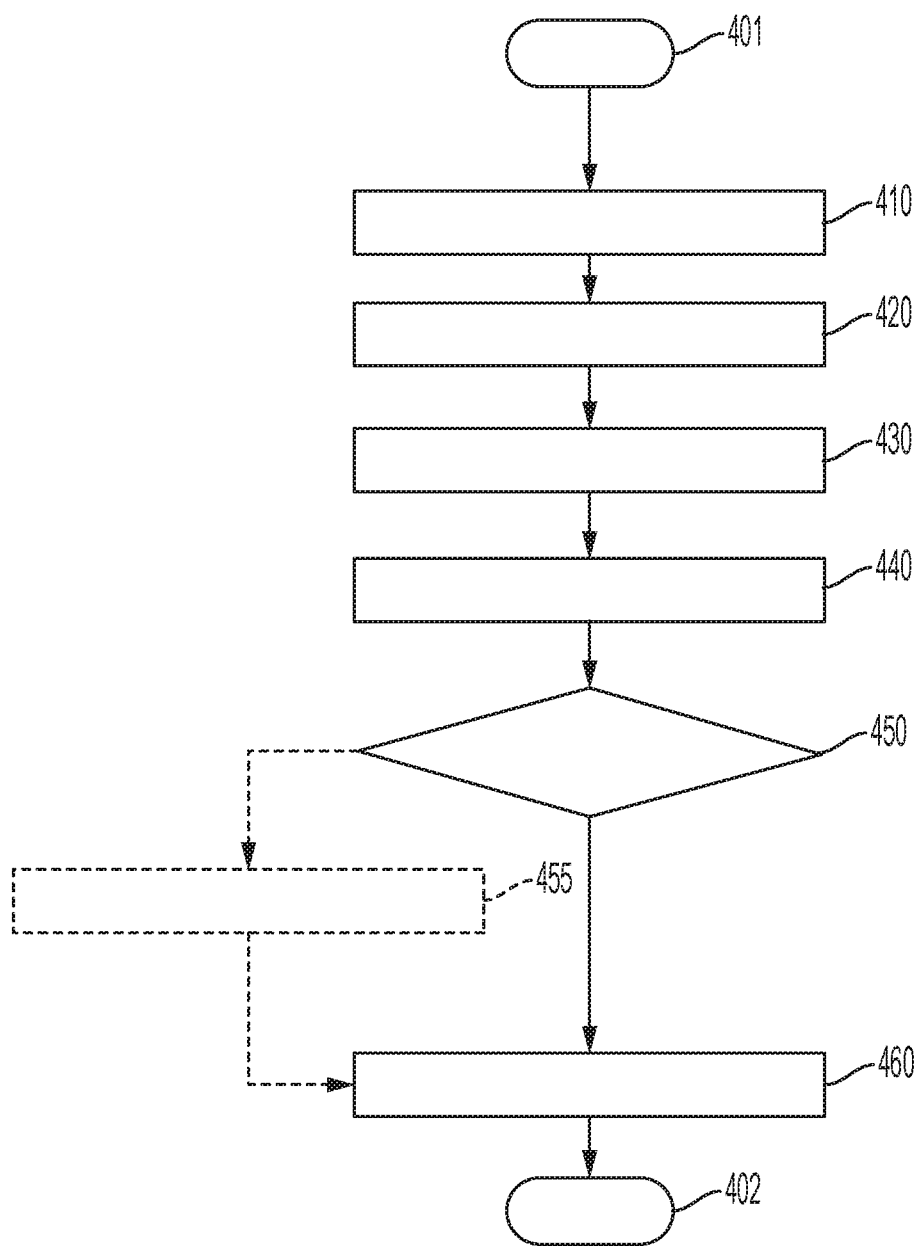
FIG. 4 is an exemplary flow chart for the utilization of exemplary system and method aspects disclosed herein.

Turning now to FIG. 4, there is shown an embodiment of a method 400 to optimize a lane-change maneuver such that the maneuver accounts for the difference between the vehicle operator's perception of vehicle motion while changing lanes and the vehicle operator's relative position within vehicle 12. One or more aspects of maneuver method 400 may be carried out by telematics unit 30. For example, in order to carry out the one or more aspects of method 400, memory 38 includes executable instructions stored thereon and processor 36 executes these executable instructions. One or more additional aspects of maneuver method 400 may be carried out by controller 222 implementing automated driving system (ADS) 224. One or more ancillary aspects of method 400 may also be completed by one or more vehicle devices such as, for example, control propulsion system 213, transmission 214, steering system 216, and wheel brakes 217.

Figure 5:
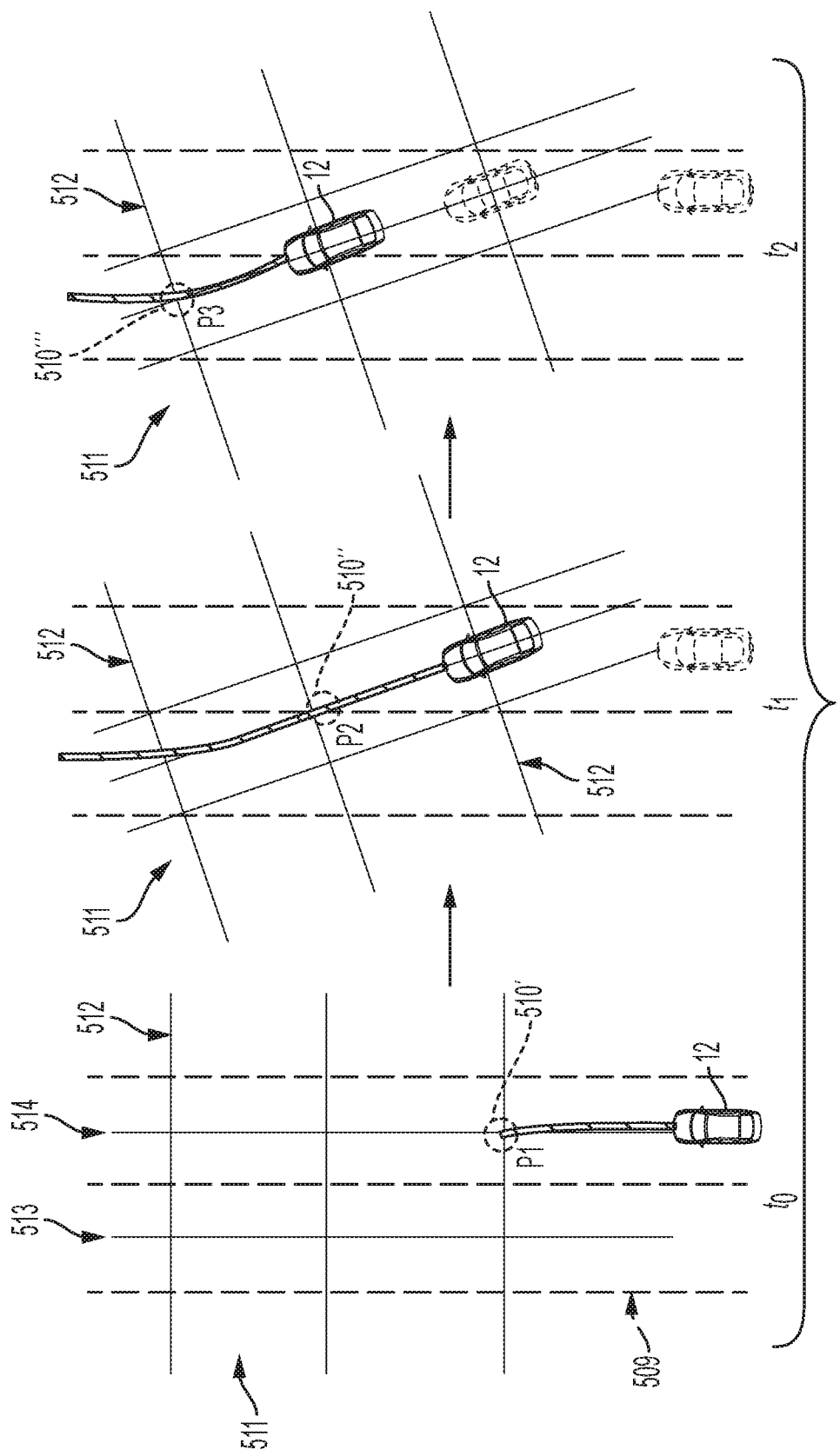
FIG. 5 is an illustrative aspect of the process flow of FIG. 4.

With further reference to FIG. 5, method 400 begins at 401 in which the vehicle 12 is autonomously traversing along a stretch of a roadway 509. In step 410, sensor data from driving sensors 226 and vehicle location data (e.g., via GNSS receiver 22) is collected. The data is then used to formulate understanding of the current "scene" along the roadway 509. For example, the data can be used to determine what the road ahead of the vehicle looks like (straight, curving left, curving right), the current location of vehicle 12 in relation to the rest of roadway 509, and the curvature of the lane markers for each given lane (e.g., the host lane and the target lane). Skilled artists will see that calculating route characteristics for projected vehicle routes are well known. Skilled artists will also understand that lane curvatures can be identified through one or more known Lane Map Fusion (LMF) techniques.

In addition, in this step, a target lane 513 can be determined to know which direction vehicle 12 is to change lanes (wherein the target lane 513 is to the vehicle's left or right) and thus initialize the envisioning of the lane-change trajectory. When vehicle 12 includes a Level Two and Level Three system (e.g., a known Lane Change on Demand feature), determination for desired target lane 513 side is manually provided by the vehicle operator through their operation of the turn signal stalk. As such, the vehicle's lane-change trajectory will be initialized and developed based on whether the vehicle operator operates their turn signal stalk to indicate a lane change to the right or left of vehicle 12 (i.e., to indicate that the target lane is to the right or left of vehicle 12).

When vehicle 12 includes a Level Four and Level Five system, determination for desired target lane 13 is conducted completely by vehicle 12 (e.g., via telematics unit 30 and/or ADS 224). As follows, the desired side of current arc of travel is a geometric determination. For example, if vehicle 12 is currently on a road curving right and the vehicle 12 is attempting to change lanes to a target lane 513 to the vehicle's right, then vehicle 12 should attempt to move towards inner curve arc (to effectively decrease the turn radius). Moreover, if vehicle 12 is currently on a road curving left and the vehicle 12 is attempting to change lanes to a target lane 513 to the left of vehicle 12, vehicle 12 should also attempt to move towards inner curve arc. Alternatively, the opposite logic applies in those cases in which vehicle 12 is going along a road curving to the opposite direction of the target lane 513. For example, when the vehicle 12 is attempting to move to a target lane to the vehicle's left side while the road is curved to the vehicle's right, then vehicle 12 will move towards the outer curve arc (to effectively increase the turn radius). Moreover, when the vehicle 12 is attempting to move to a target lane that is to the vehicle's right side while the road is curved to the vehicle's left, vehicle 12 will also move towards the outer curve arc (to effectively increase the turn radius).

In step 420, vehicle 12 will further the process of envisioning a vehicle trajectory by calculating numerous anchor points 510 along the projected vehicle route 511. In one or more embodiments, vehicle 12 will implement a rule of thirds technique to calculate these anchor points. As such, in these one or more embodiments, the lane-change trajectory will be broken down (as shown) into a 3×3 grid format to derive three distinctive anchor points (pivot points—510', 510", 510'''). It should be appreciated that this rule of thirds technique is designed to satisfy the vehicle operator's psychological constraint associated with their perception of vehicle motion since their viewpoint is biased left to the center line of the vehicle's host lane.

In addition, in this step, vehicle 12 will calculate a first anchor point (p1) 510'. This first anchor point 510' may be based on the following formula:

$$p_{long1} = \frac{1}{3} t_{LCoD} \times v_x$$

where $t_{LCoD}$ is the time needed to complete the lane-change maneuver (i.e., lane change on demand), and $V_x$ is the velocity of vehicle 12 (i.e., the average velocity of vehicle 12 throughout the lane-change maneuver). For example, when the vehicle 12 allocates nine (9) seconds for the full lane-change maneuver ($t_{LCoD}$=9 sec.), the first anchor point 510' will be three (3) seconds ahead of the current location of vehicle 12 (shown at time=$t_0$). Thus, if vehicle 12 is moving at an average rate of 30 meters per second, then the first anchor point 510' will be 90 meters away in the longitudinal direction relative to the vehicle's current location (the location at time=$t_0$).

The lateral position of the first anchor point 510' can be calculated based on the following formula:

$$p_{lat1} = \frac{W_t + W_h}{6}$$

where $W_t$ is the width of target lane 513 (i.e., the lane in which vehicle 12 is attempting to travel at time=$t_2$) and $W_h$ is the width of the host lane 514 (i.e., the lane in which vehicle 12 is traveling at to). As such, the lateral distances of this anchor point 510' is achieved by taking a sixth of the sum between the widths of the target lane 513 and host lane 514. For example, when the widths of the host and target lanes 513, 514 are each 3.6 meters, the first anchor point 510' will be 1.2 meters to the left or right of the vehicle location shown at time=$t_0$ (i.e., the starting location of vehicle 12).

The vehicle 12 may also select a calibration angle at which the lane-change maneuver will be felt by the driver but not to the point at which it would feel excessive. For instance, when vehicle 12 is traveling absolutely parallel to the lane markers, then vehicle 12 can implement a calibration angle that is a heading change of a fraction of a percent so as to allow the lane change to be so gradual that a majority of vehicle operator's (and vehicle passengers) would barely notice the lane-change maneuver occurring. This calibration angle is represented in FIG. 5 through the counter-clockwise rotation of the grid 512 from time $t_0$ to time $t_1$. As follows, the more drastic the rotation of grid 512, the more the lane-change maneuver should be felt by the vehicle operator (and vehicle passengers). Thus, the calibration angle and the rate of change of the calibration angle feeds into lateral accel and jerk (dynamically).

In step 430, vehicle 12 will calculate a second anchor point (p2) 510". This second anchor point is considered the point at which the vehicle is to cross the lane boundary between the host lane 514 and target lane 513. The longitudinal position of the second anchor point 510" can also be based on the formula (discussed above):

$$p_{long2} = \tfrac{1}{3} t_{LCoD} \times v_x$$

As follows, when the vehicle 12 allocates nine (9) seconds for the full lane-change maneuver ($t_{LCoD}$=9 sec.), the second anchor point 510" will be six (6) seconds ahead of the vehicle's starting location. Thus, if vehicle 12 is moving at a rate of 30 meters per second, then the second anchor point 510' will be 180 meters away in the longitudinal direction relative to the vehicle's starting location (at time=$t_0$) and 90 meters away in the longitudinal direction relative to the location of the first anchor point (at time=$t_1$).

The lateral position of the second anchor point 510" can be calculated based on the following formula:

$$p_{lat2} = \frac{W_t + W_h}{4}$$

as such, the lateral distances of this anchor point 510" is achieved by taking a fourth of the sum between the widths of the target lane 513 and host lane 514. For example, when the widths of the host and target lanes 513, 514 are each 3.6 meters, the second anchor point 510" will be 1.8 meters to the left or right of the starting location of vehicle 12. It should also be appreciated that the location of the first anchor point 510' will have an effect on the location of the second anchor point 510". Thus, the second anchor point 510" is relative to the first anchor point 510'.

In step 440, vehicle 12 will calculate a third anchor point (p3) 510'''. This third anchor point 510''' is considered the point at which counter steering torque would be applied to center the vehicle 12 while traveling in the target lane 513. In essence, this would be the location at which vehicle 12 applies hooks to calibrators to create a counter-steering effect (which causes steering wheel to turn in direction opposite to the current heading and thus straightening out the host vehicle within the target lane 513). The longitudinal position of the third anchor point 510''' can also be based on the formula:

$$p_{long3} = \tfrac{1}{3} t_{LCoD} \times v_x$$

As follows, when the vehicle 12 allocates nine (9) seconds for the full lane-change maneuver ($t_{LCoD}$=9 sec.), the third anchor point 510''' will be nine (9) seconds ahead of the vehicle's starting location. Thus, if vehicle 12 is moving at a rate of 30 meters per second, then the third anchor point 510" will be 270 meters in the longitudinal direction relative to the vehicle's starting location (at time=$t_0$), 180 meters in the longitudinal direction relative to the location of the first anchor point 510' (at time=$t_1$), and 90 meters in the longitudinal direction relative to the location of the second anchor point (at time=$t_2$).

The lateral distance of the third anchor point 510''' will also be based on the formula:

$$P_{lat3} = \frac{W_t + W_h}{6} + P_{lat1} = 2 \times P_{lat1}$$

As follows, when the widths of the host and target lanes 513, 514 are each 3.6 meters, the lateral position of the third anchor point 510''' (at time=$t_2$) will be 2.4 meters to the left or right of the starting location of the vehicle 12. It should be appreciated that the first anchor point (p1) 510' and third anchor point (p3) 510''' are equally spaced from the second anchor point (p2) 510", which is 0.6 meters in this instance, and which causes retainment of the grid format for the lane change trajectory 512. It should also be appreciated that the location of the first and second anchor points 510' and 510" will have an effect on the location of the third anchor point 510'''. Thus, the third anchor point 510''' is relative to the second anchor point 510", which is relative to the first anchor point 510'.

Figure 6:
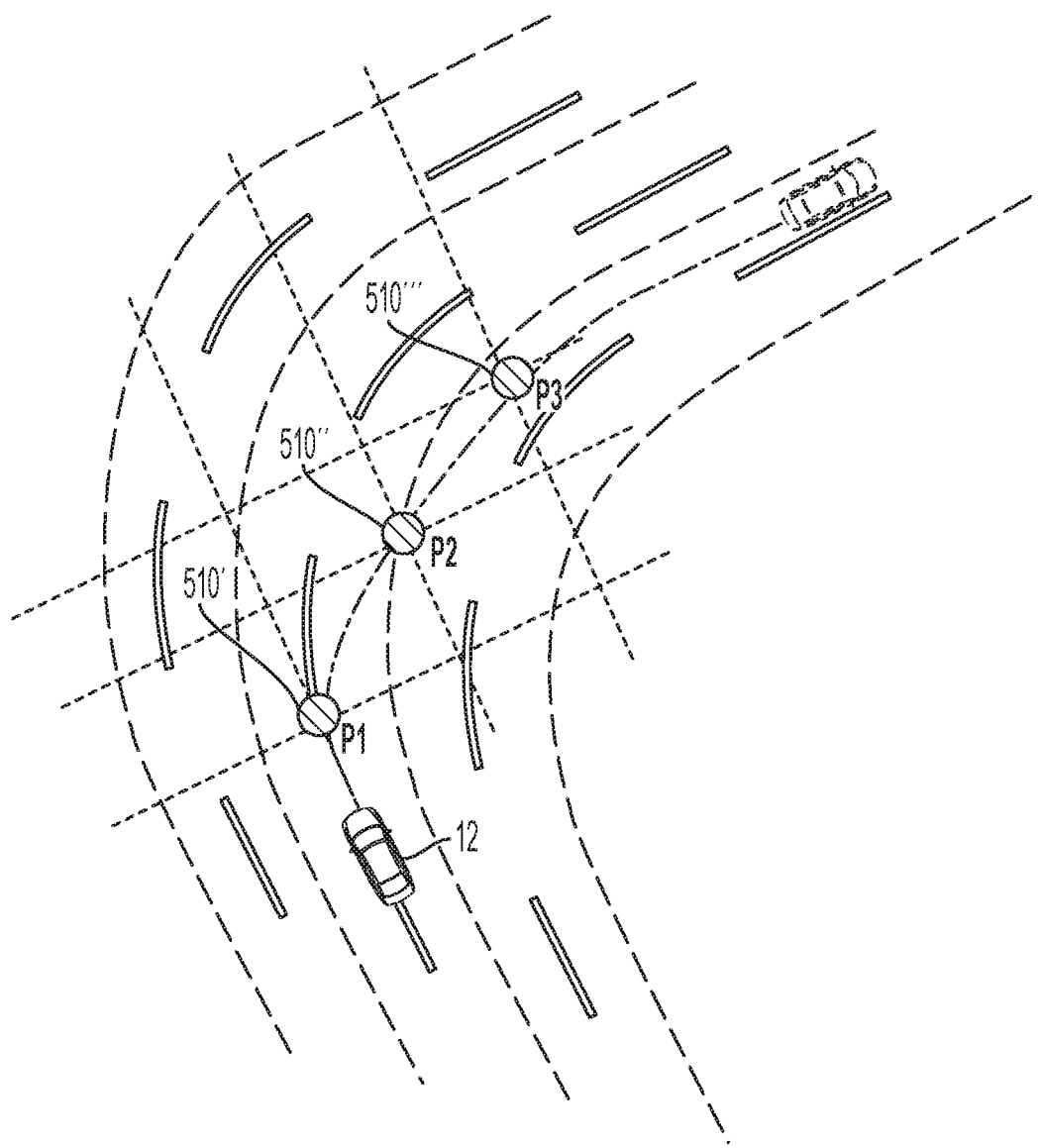
FIG. 6 is another illustrative aspect of the process flow of FIG. 4.

In step 450, with additional reference to FIG. 6, vehicle 12 will generate an envisioned lane-change trajectory 515 that overlaps each one of the anchor points 510. This generated trajectory 515 may also be at least temporarily stored in memory 38. In this step, vehicle 12 will also determine whether the lane-change trajectory conforming to the anchor points 510 is in compliance with one or more vehicle dynamics thresholds. These vehicle dynamics thresholds may be provided by a calibration/performance team and may specify the max amount of lateral velocity, acceleration, and jerk that are considered to be acceptable for vehicle 12. These thresholds may also be stored in memory 38. For instance, vehicle 12 (telematics unit 30) may walk through each calculated anchor point 510 for this trajectory and calculate a relative lateral velocity, acceleration, and jerk based on the current or expected longitudinal velocity. When all constraints are satisfied, method 400 will move to step 460; otherwise method 400 will move to optional step 455.

In optional step 455, vehicle 12 will adjust each anchor point 510 to correct for the vehicle dynamics thresholds. As follows, one or more of the anchor points 510 may be moved along the trajectory of the lane-change maneuver to a location that will comply with the vehicle dynamics thresholds. These adjustment locations will also ensure each anchor point location complies with the rule of thirds formulations discussed above. Thus, when one of the anchor points 510 is adjusted to correct for the vehicle dynamics thresholds, each subsequent anchor point location 510 will be affected. In step 460, via ADS 224, vehicle 12 will autonomously carry out the lane-change maneuver that conforms to the generated lane-change trajectory. After step 460, method 400 moves to completion 402.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method to establish a lane-change maneuver, the method comprises:
    calculating a plurality of anchor points along a projected vehicle route; and
    based on the plurality of anchor points, generating a lane-change maneuver trajectory, wherein the plurality of anchor points comprises:
    a first anchor point based on time;
    relative to the first anchor point, a second anchor point where the vehicle would cross a lane boundary from a host lane to a target lane; and
    relative to the second anchor point, a third anchor point where counter steering torque would be applied to center the vehicle in the target lane.

2. The method of claim 1, further comprising the step of, based on the lane-change maneuver trajectory, performing the lane-change maneuver through an autonomous vehicle.

3. The method of claim 1, further comprising the step of verifying the lane-change maneuver trajectory is in compliance with one or more vehicle dynamics thresholds.

4. The method of claim 1, wherein the lane-change maneuver trajectory overlaps each anchor point of the plurality of anchor points.

5. The method of claim 1, wherein each anchor point of the plurality of anchor points is located in a longitudinal direction of the projected vehicle route based on the following:

$$p_{long} = \frac{1}{3} t_{LCoD} \times v_x.$$

6. The method of claim 1, wherein the second anchor point of the plurality of anchor points is located in the lateral direction of the projected vehicle route based on the following:

$$p_{lat} = \frac{W_t + W_h}{4}.$$

7. A system to establish a lane-change maneuver, the system comprises:
    a memory configured to comprise one or more executable instructions and a processor configured to execute the executable instructions, wherein the executable instructions enable the processor to carry out the following steps:
    calculating a plurality of anchor points along a projected vehicle route; and
    based on the plurality of anchor points, generating a lane-change maneuver trajectory, wherein the plurality of anchor points comprises:
    a first anchor point based on time;
    relative to the first anchor point, a second anchor point where the vehicle would cross a lane boundary from a host lane to a target lane; and
    relative to the second anchor point, a third anchor point where counter steering torque would be applied to center the vehicle in the target lane.

8. The system of claim 7, wherein the executable instructions enable the processor to carry out an additional step of, based on the lane-change maneuver trajectory, performing the lane-change maneuver through an autonomous vehicle.

9. The system of claim 7, wherein the executable instructions enable the processor to carry out an additional step of verifying the lane-change maneuver trajectory is in compliance with one or more vehicle dynamics thresholds.

10. The system of claim 7, wherein the lane-change maneuver trajectory overlaps each anchor point of the plurality of anchor points.

11. The system of claim 7, wherein each anchor point of the plurality of anchor points is located in a longitudinal direction of the projected vehicle route based on the following:

$$p_{long} = \frac{1}{3} t_{LCoD} \times v_x.$$

12. The system of claim 7, wherein the second anchor point of the plurality of anchor points is located in the lateral direction of the projected vehicle route based on the following:

$$p_{lat} = \frac{W_t + W_h}{4}.$$

13. A non-transitory and machine-readable medium having stored thereon executable instructions adapted to establish a lane-change maneuver, which when provided to a processor and executed thereby, causes the processor to carry out the following steps:
    calculating a plurality of anchor points along a projected vehicle route; and
    based on the plurality of anchor points, generating a lane-change maneuver trajectory, wherein the plurality of anchor points comprises:
    a first anchor point based on time;
    relative to the first anchor point, a second anchor point where the vehicle would cross a lane boundary from a host lane to a target lane; and
    relative to the second anchor point, a third anchor point where counter steering torque would be applied to center the vehicle in the target lane.

14. The non-transitory and machine-readable memory of claim 13, further comprises an additional step of, based on the lane-change maneuver trajectory, performing the lane-change maneuver through an autonomous vehicle.

15. The non-transitory and machine-readable memory of claim 13, further comprises an additional step of verifying the lane-change maneuver trajectory is in compliance with one or more vehicle dynamics thresholds.

16. The non-transitory and machine-readable memory of claim 13, wherein the lane-change maneuver trajectory overlaps each anchor point of the plurality of anchor points.

17. The non-transitory and machine-readable memory of claim 13, wherein each anchor point of the plurality of anchor points is located in a longitudinal direction of the projected vehicle route based on the following:

$$p_{long} = \frac{1}{3} t_{LCoD} \times v_x.$$

* * * * *